United States Patent
Kostrzewa et al.

(10) Patent No.: US 10,182,195 B2
(45) Date of Patent: Jan. 15, 2019

(54) PROTECTIVE WINDOW FOR AN INFRARED SENSOR ARRAY

(71) Applicant: FLIR Systems, Inc., Wilsonville, OR (US)

(72) Inventors: Joseph Kostrzewa, Buellton, CA (US); Bruce Covington, Santa Barbara, CA (US); Chris Posch, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/852,313

(22) Filed: Sep. 11, 2015

(65) Prior Publication Data

US 2016/0088240 A1 Mar. 24, 2016

Related U.S. Application Data

(60) Provisional application No. 62/054,313, filed on Sep. 23, 2014.

(51) Int. Cl.
*H04N 5/33* (2006.01)
*H04N 5/225* (2006.01)

(52) U.S. Cl.
CPC ............ *H04N 5/33* (2013.01); *H04N 5/2253* (2013.01); *H04N 5/2257* (2013.01)

(58) Field of Classification Search
CPC ....... H04N 5/33; H04N 5/2252; H04N 5/2254
See application file for complete search history.

(56) References Cited

U.S. PATENT DOCUMENTS

| | | | | |
|---|---|---|---|---|
| 4,063,812 A | * | 12/1977 | Abraham | G03B 27/6271 355/125 |
| 4,661,707 A | * | 4/1987 | Jungkman | G01J 5/061 250/352 |
| 5,677,762 A | * | 10/1997 | Ortyn | G02B 21/082 356/39 |
| 6,144,031 A | * | 11/2000 | Herring | G01J 5/04 250/252.1 |
| 6,841,309 B1 | * | 1/2005 | Alpay | G03F 1/48 430/5 |
| 7,910,890 B2 | * | 3/2011 | Hinnrichs | G01J 5/061 250/338.5 |
| 2006/0091310 A1 | * | 5/2006 | Furry | G01J 5/061 250/330 |
| 2009/0161006 A1 | | 6/2009 | Lee | |
| 2009/0166319 A1 | * | 7/2009 | Courboin | G03F 1/14 216/13 |
| 2010/0182330 A1 | | 7/2010 | Tener et al. | |

(Continued)

FOREIGN PATENT DOCUMENTS

WO  WO 00/37970  6/2000

*Primary Examiner* — Marcus Taningco
(74) *Attorney, Agent, or Firm* — Haynes and Boone, LLP

(57) ABSTRACT

Various embodiments of the present disclosure may include a focal plane array configured to capture thermal image data from a scene. The embodiments may further include a sensor window displaced a first distance from the focal plane array. The embodiments may also include a protective window displaced a second distance greater than the first distance from the focal plane array, wherein the second distance causes damage or debris incident on the protective window to be out of focus in the thermal image data.

19 Claims, 11 Drawing Sheets

(56) References Cited

U.S. PATENT DOCUMENTS

| | | | |
|---|---|---|---|
| 2011/0169962 A1* | 7/2011 | Gat | H04N 5/33 348/164 |
| 2012/0050589 A1* | 3/2012 | Ueno | H04N 9/045 348/274 |
| 2013/0107061 A1 | 5/2013 | Kumar et al. | |
| 2014/0253735 A1 | 9/2014 | Fox et al. | |
| 2014/0293062 A1* | 10/2014 | Hoye | G01J 3/0229 348/162 |

* cited by examiner

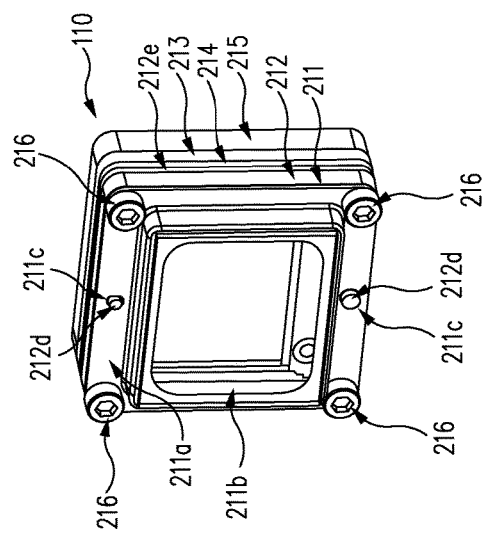
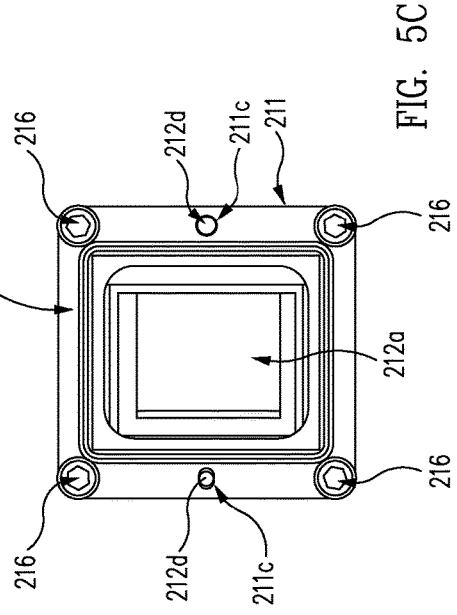
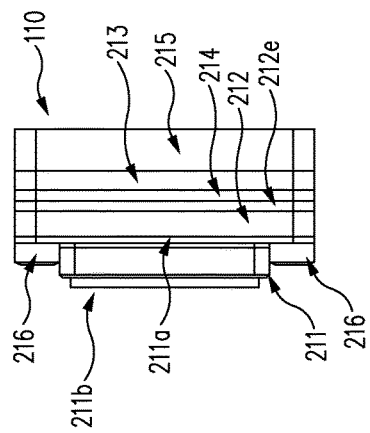
FIG. 5A
FIG. 5B
FIG. 5C

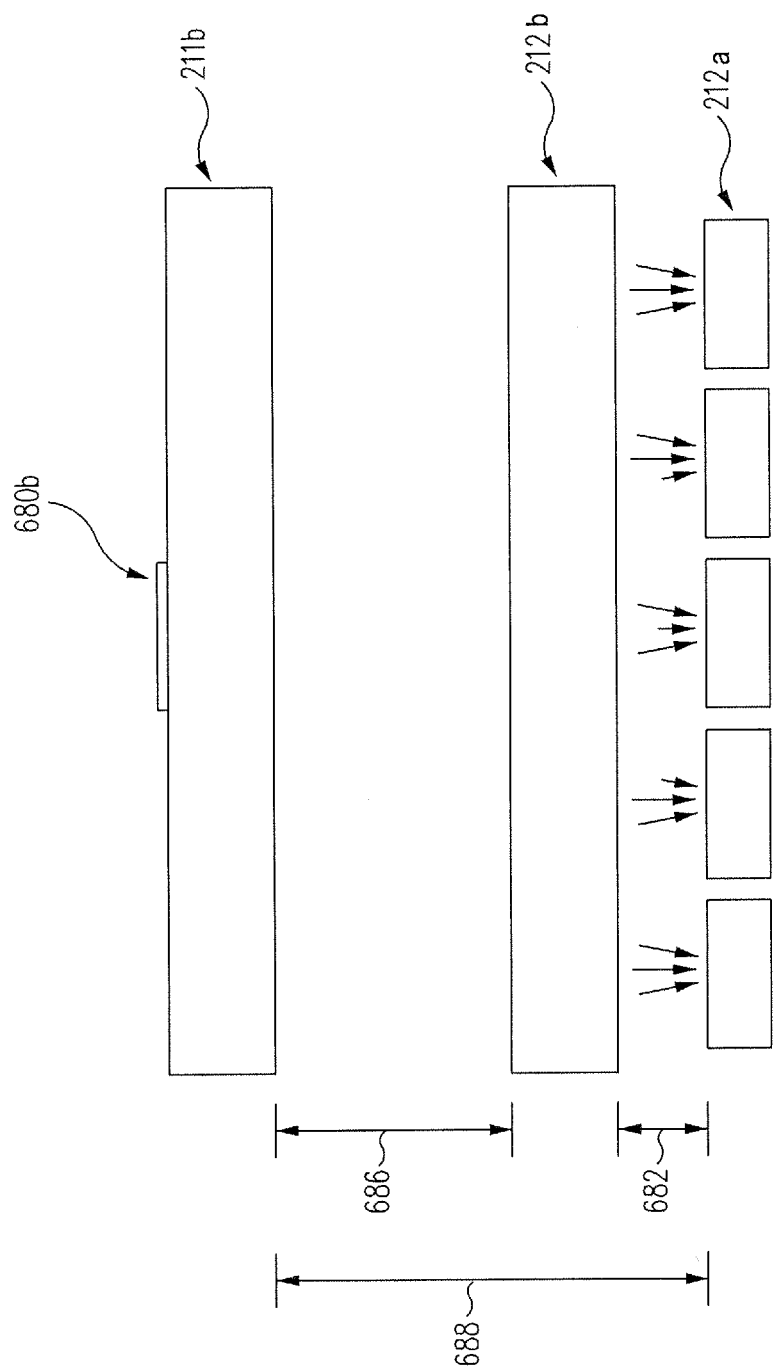

PROTECTIVE WINDOW FOR AN INFRARED SENSOR ARRAY

CROSS-REFERENCE TO RELATED APPLICATIONS

This application claims the benefit of and priority to U.S. Provisional Patent Application No. 62/054,313 filed Sep. 23, 2014 and entitled "PROTECTIVE WINDOW FOR AN INFRARED SENSOR ARRAY" which is hereby incorporated by reference in its entirety.

TECHNICAL FIELD

One or more embodiments of the invention relate generally to infrared imaging devices and more particularly, for example, to reduce image artifacts caused by environmental factors and/or other defects.

BACKGROUND

Infrared imaging devices may include a window or lens in front of a focal plane array that detects incoming thermal image radiation. Construction of these imaging devices often occurs in clean rooms, so-called due to their relative absence of environmental and atmospheric impurities, e.g., dust particulate matter. Such impurities may settle on an optical surface (e.g., a window or lens) that is within the optical focal field.

These environmental factors may cause inconsistencies or flaws in the optical surface (e.g., damage caused by such impurities and/or settling of such impurities on the optical surface) and therefore the resulting image data obtained by the infrared imaging device. This concern is particularly true for an optical surface that is located close to the sensor array such that the inconsistencies or flaws are in relatively good focus. Consequently, if such an optical surface remains open to environmental factors after construction of the infrared imaging device, those environmental factors may degrade the window or lens over time resulting in poorer performance of the device.

SUMMARY

An infrared imaging device may include a focal plane array and a sensor window packaged together and having backend electronics to receive and process thermal image data. For example, a wafer-level packaged (WLP) or pixel-level packaged (PLP) infrared sensor assembly may constitute one or a plurality of infrared sensors constituting the focal plane array packaged with the sensor window (e.g., an optical surface to the package). With the sensor window located in close proximity to the sensor array (e.g., the focal plane array).

In some embodiments, an infrared imaging device is constructed where the focal window or lens is not encased in additional body structure for the device. For example, some uses of the infrared imaging device may include different backend electronics for processing and/or different optics used with the device. However, without insuring that the windows and/or lens of the infrared imaging devices are free from environmental debris and damage, the resulting device may be suboptimal or insufficient to meet the needs of the required imaging use. In various embodiments, the sensor component may be manufactured in one facility, and a complete camera (e.g., including an encasing house and/or lens assembly) may be manufactured and/or assembled in another facility. In other embodiments, the sensor component may be field-replaced in an existing encasing housing and/or lens assembly.

The sensor window may be displaced a first distance from the focal plane where the sensor window is substantially in focus when viewed by the focal plane array. To protect the sensor window, a protective window is disposed over the optical surface and displaced at a second distance from the focal plane array, where the second distance is larger than the first distance and causes the surface of the protective window to be substantially or completely out of focus to the focal plane array. Thus, the protective window prevents environmental/atmospheric damage and debris from affecting the sensor window. As a result, image artifacts (e.g., blemishes) resulting from such damage and debris are substantially reduced or eliminated in thermal image data resulting from use of the infrared imaging device.

In one embodiment, a device comprises a focal plane array configured to capture thermal image data from a scene, a sensor window displaced a first distance from the focal plane array, and a protective window displaced a second distance greater than the first distance from the focal plane array, wherein the second distance causes damage or debris incident on the protective window to be out of focus in the thermal image data.

In another embodiment, a method comprises providing a focal plane array configured to capture thermal image data from a scene, providing a sensor window displaced at a first distance from the focal plane array, and providing a protective window displaced a second distance greater than the first distance from the focal plane array, wherein the second distance causes damage or debris incident on the protective window to be out of focus in the thermal image data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5A-C illustrate three views of a constructed infrared imaging device having a protective window assembly, according to an embodiment.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
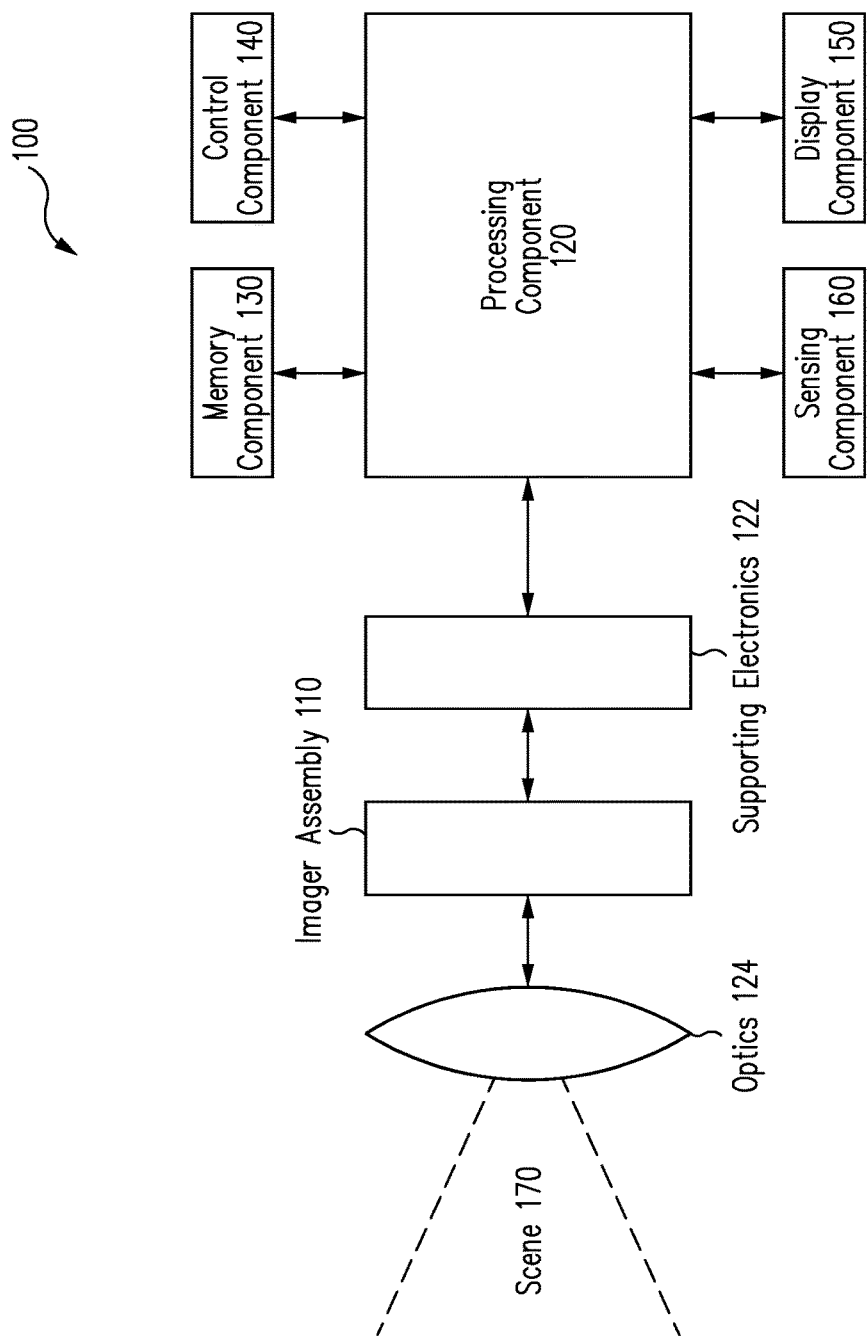
FIG. 1 illustrates a block diagram of a system for infrared imaging processing, according to an embodiment.

FIG. 1 shows a block diagram of a system 100 (e.g., an infrared imaging device or infrared camera) for infrared image capturing and processing in accordance with an embodiment. The system 100 comprises, in one implementation, an imager assembly 110, a processing component 120, a memory component 130, a control component 140, and a display component 150. In some embodiments, the system 100 may include supporting electronics 122, optics 124, and a sensing component 160

The system 100 may represent an infrared imaging system, such as an infrared camera and processing electronics, configured to capture and process thermal images, such as image and video images of a scene 170. The system 100 may represent any type of infrared camera adapted to detect infrared radiation and provide representative data and information (e.g., thermal infrared image data of a scene). For example, the system 100 may represent an infrared camera that is directed to the near, middle, and/or far infrared spectrums. In another example, the infrared image data may comprise non-uniform data (e.g., real image data that is not from a shutter or black body) of the scene 170, for processing. The system 100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, system 100 comprises an imager assembly 110 configured to capture infrared image data. In this respect, imager assembly 110 comprises, in one embodiment, one or more infrared sensors (e.g., any type of multi-pixel infrared detector, such as a focal plane array) for capturing infrared image data (e.g., still image data and/or video data) representative of an image, such as scene 170. Imager assembly 110 may include, in one part, a wafer-level packaged (WLP) or pixel-level packaged (PLP) sensor having a sensor window (e.g., an optical surface). In order to protect the sensor window or optical surface from exposure and thus damage and debris, imager assembly 110 may further include a protective window configured to be out of focus to the sensor assembly, as will be explained in more detail herein.

Imager assembly 110 may further include processing electronics configured to receive, process, transmit, and/or record thermal image data received from the sensor assembly (e.g., the focal plane array). In one aspect, the infrared image data (e.g., infrared video data) may comprise non-uniform data (e.g., real image data) of an image, such as scene 170. The processing component 120 may be adapted to process the infrared image data (e.g., to provide processed image data), store the infrared image data in the memory component 130, and/or retrieve stored infrared image data from the memory component 130. For example, the processing component 120 may be adapted to process infrared image data stored in the memory component 130 and provide processed image data and information (e.g., captured and/or processed infrared image data).

In various embodiments, the processing component 120 comprises a processor, such as one or more of a microprocessor, a single-core processor, a multi-core processor, a microcontroller, a logic device (e.g., a programmable logic device (PLD) configured to perform processing functions), a digital signal processing (DSP) device, or other processing device. The processing component 120 may be adapted to interface and communicate with the components 122, 124, 130, 140, 150, and 160 to perform method and processing steps and/or operations, as described herein. In one aspect, the processing component 120 may be adapted to perform various other image processes including noise reduction and scaling the infrared image data.

In order to further receive, process, and transmit infrared image data, the system 100 may include the supporting electronics 122 and the optics 124. The supporting electronics 122 may be configured to provide additional processing of infrared image data, including adjustment of infrared imaging device temperature and capture temperature range (e.g., temperature and capture temperature of the imager assembly 110), gain, resolution, and/or adjustment of the optics 124. The optics 124 may be provided to the imager assembly 110 in order to provide various optical abilities and/or options to the system 100, including zoom, resolution, focus, or other optical function. The processing component 120 and the supporting electronics 122 may access and manipulate the optics 124 to provide various features to the system 100. Processes, implemented, for example, by software instructions, may be accessed by the processing component 120 and/or the supporting electronics 122 to provide such features.

It should be appreciated that various processes may be integrated in software and/or hardware as part of the processing component 120, with code (e.g., software or configuration data) stored, for example, in the memory component 130. Embodiments of the software and/or processes, as disclosed herein, may also be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 100, with the processes and software provided to the system 100 by coupling the computer-readable medium to the system 100 and/or by the system 100 downloading (e.g., via a wired link and/or a wireless link) the processes and software from the computer-readable medium.

The memory component 130 comprises, in one embodiment, one or more memory devices adapted to store data and information, including infrared image data and information (e.g., metadata for the infrared image data). The memory device 120 may comprise one or more various types of memory devices including volatile and non-volatile memory devices, such as RAM (Random Access Memory), ROM (Read-Only Memory), EEPROM (Electrically-Erasable Read-Only Memory), flash memory, or other storage device/ mechanism. The processing component 120 may be adapted to execute software stored in the memory component 130 so as to perform method and process steps and/or operations described herein.

The control component 140 comprises, in one embodiment, a user input and/or interface device, such as a rotatable knob (e.g., potentiometer), push buttons, slide bar, keyboard, or other input/output device, that is adapted to generate a user input control signal. The processing component 120 may be adapted to sense control input signals from a user via the control component 140 and respond to any sensed control input signals received therefrom. The processing component 120 may be adapted to interpret such a control input signal as a value, as generally understood by one skilled in the art.

In one embodiment, the control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art. The control component 140 may further be configured to access and manipulate the supporting electronics 122 and the optics 124 to provide the aforementioned functions.

The display component 150 comprises, in one embodiment, an image display device (e.g., a liquid crystal display (LCD)) or various other types of generally known video displays or monitors. The processing component 120 may be adapted to display image data and information on the display component 150. The processing component 120 may be adapted to retrieve image data and information from the memory component 130 and display any retrieved image data and information on the display component 150. The display component 150 may comprise display electronics, which may be utilized by the processing component 120 to display image data and information (e.g., infrared images). The display component 150 may be adapted to receive image data and information directly from the image capture component 130 via the processing component 120, or the image data and information may be transferred from the memory component 130 via the processing component 120.

The sensing component 160 comprises, in one embodiment, one or more sensors of various types, depending on the application or implementation requirements, as would be understood by one skilled in the art. The sensors of the sensing component 160 provide data and/or information to at least the processing component 120. In one aspect, the processing component 120 may be adapted to communicate with the sensing component 160 (e.g., by receiving sensor information from the sensing component 160) and with the imager assembly 110 (e.g., by receiving data and information from the imager assembly 110 and providing and/or receiving command, control, and/or other information to and/or from one or more other components of the system 100).

In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the data provided by the imager assembly 110.

In some implementations, the sensing component 160 (e.g., one or more of sensors) may comprise devices that relay information to the processing component 120 via wired and/or wireless communication. For example, the sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 100 may be combined and/or implemented or not, as desired or depending on the application or requirements, with the system 100 representing various functional blocks of a related system. In one example, the processing component 120 may be combined with the imager assembly, the support electronics 122, the optics 124, the memory component 130, the display component 150, and/or the sensing component 160. In another example, the processing component 120 may be combined with the imager assembly 110 with only certain functions of the processing component 120 performed by circuitry (e.g., a processor, a microprocessor, a logic device, and/or a microcontroller) within the imager assembly 110. Furthermore, various components of the system 100 may be remote from each other (e.g., the supporting electronics 122 may comprise a remote sensor with processing component 120 representing a computer that may or may not be in communication with the imager assembly 110).

Figure 2A:
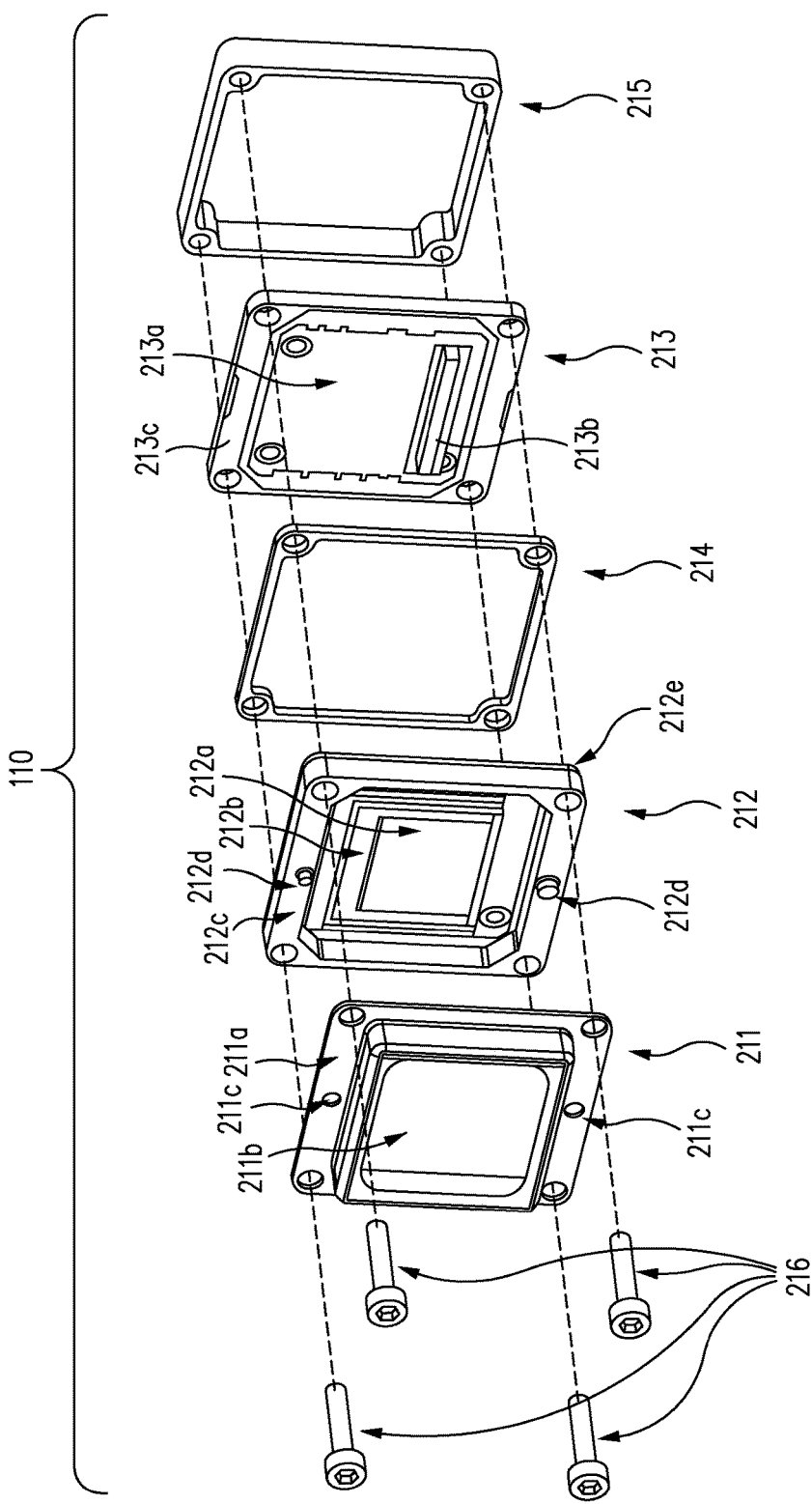
FIG. 2A illustrates an exploded view of an imager assembly with a protective window assembly, according to an embodiment.

FIG. 2A illustrates an exploded view of an imager assembly 110 with a protective window assembly 211, according to an embodiment. The imager assembly 110 of FIG. 1 is shown expanded into various parts that may be utilized as imager assembly 110. Thus, imager assembly 110 is shown with the protective window assembly 211, a sensor/window assembly 212, electronics 213, a first spacer 214, a second spacer 215, and an attachment mechanism 216. In other embodiments, more or less components may be used to implement imager assembly 110.

The protective window is constructed using a frame 211a that provides an attachment to the sensor/window assembly 212. The protective window assembly 211 may further include a window 211b that is at least transmissive in the desired waveband and configured to be durable. The window 211b may be constructed of a material such as silicon, germanium, zinc selenide, chalcogenate glass, plastics, polymers, sapphire, and/or other material as appropriate. The frame 211a may be constructed of a material having a coefficient of thermal expansion (CTE) matching or similar to that of the material of the window 211b. In other embodiments, a low stress (e.g., flexible) adhesive is used to bond the frame 211a and the window 211b to compensate for a CTE mismatch between the frame 211a and the window 211b. The window 211b is offset from the frame 211a so that the window 211b is not flush with the base of the frame 211a (e.g., is raised or extended some height from the flanged base of frame the 211a). Additionally, the frame 211a may include holes, threads, or other fastener for the attachment mechanism 216, or the attachment mechanism 216 may correspond to a glue, epoxy or ZYMET (which may also be used to bond the window 211b to the frame 211a) so that the frame 211a is substantially free from additional holes, threads, or other physical fastening mechanism. Thus, the attachment mechanism 216 may use various forms of chemical and/or mechanical attachments as required. The frame 211a may further include an alignment aperture 211c that may be configured to attach, mate, or otherwise assist in alignment with one or more other units of the imager assembly 110.

The sensor/window assembly 212 for the imager assembly 110 may include a focal plane array 212a and a sensor window 212b. Focal plane array 212a may include a plurality of infrared detectors implemented in an array or other fashion on a PCB 212e (e.g., a substrate configured to accept the focal plane array 212a). The infrared detectors may be configured to detect incoming infrared radiation (e.g., infrared energy) from scene 170 including, for example, mid wave infrared wave bands (MWIR), long wave infrared wave bands (LWIR), and/or other thermal imaging bands as may be desired in particular embodiments. The infrared detectors may be implemented, for example, as infrared photodetectors, bolometer/microbolometers, or other types of thermal imaging infrared detectors arranged in any desired array pattern to provide a plurality of pixels.

The focal plane array 212a may be implemented, for example, as a vacuum package assembly (e.g., sealed with sensor window 212b). In various embodiments, the focal plane array 212a and the sensor window 212b may be formed/fabricated using wafer level packaging techniques. For example, the focal plane array 212a and the sensor window 212b may constitute a WLP or PLP sensor assembly configured to detect thermal image data.

As previously stated, the focal plane array 212a may comprise one or more infrared detectors configured as infrared sensors for capturing infrared image data (e.g., still image data and/or video data) representative of an image, such as scene 170 of FIG. 1. In one implementation, the infrared detectors of the focal plane array 212a provide for representing (e.g., converting) the captured thermal image radiation as digital data (e.g., via an analog-to-digital converter included as part of the imager assembly 110 or separate from the imager assembly as part of the system 100, e.g., supporting electronics 122 of FIG. 1). Thus, as previously discussed, the infrared image data (e.g., infrared video data) may comprise non-uniform data (e.g., real image data) of an image, such as scene 170. The processing component 110 of FIG. 1 may be adapted to process the infrared image data (e.g., to provide processed image data), store the infrared image data in the memory component 130, and/or retrieve stored infrared image data from the memory component 130, as previously discussed.

The sensor window 212b may constitute a window for the focal plane array 212a that is transmissive to thermal/infrared radiation and within the spectral band of the focal plane array. The sensor window 212b may act as a transmissive window that allows incoming infrared radiation to pass and be detected by the focal plane array 212a. In embodiments, the sensor window 212b may act as a focusing optic for the focal plane array 212a. It is desirable that the sensor window 212b be free or substantially free from defects, damage, and debris collection to insure no inconsistencies and/or blemishes are produced during image formation of an infrared scene (e.g., of received thermal/infrared radiation). The focal plane array 212a and the sensor window 212b may be held in place by insetting the package within a frame 212c. Moreover, the frame 212c includes at least one alignment pin 212d that may join with the alignment aperture 211c to insure proper alignment of the protective window assembly 211 and the sensor/window assembly 212. The alignment aperture 211c may be oversized as there may be no strict alignment requirements where the protective window assembly 211 does not provide optical power and/or focus (e.g., where the protective window assembly 211 provides on transmission of the desired waveband and does not produce optical characteristics). Thus, the alignment pin 212d may instead be utilized with further lenses and/or optics in order to provide additional optical characteristics for the imager assembly 110. However, if protective window assembly 211 instead provides optical power and/or characteristics (e.g., may provide some level of focus), the alignment pin 212d and the alignment aperture 211c may instead provide for true alignment of the protective window assembly 211.

The imager assembly 110 further includes electronics 213 that may connect to the sensor/window assembly 212 and receive, process, and/or transmit thermal image data captured by the sensor/window assembly 212. In this regard, the electronics 213 may calibrate the sensor/window assembly 212 in order to receive and provide interpretable (e.g., readable) thermal still and/or video images. Thus, the electronics 213 may adjust the sensor/window assembly 212 and/or the focal plane array 212a so that received thermal radiation by the sensor/window assembly 212 and the focal plane array 212a can be collected to form an image of a scene. In some embodiments, the electronics 213 include a field-programmable gate array 213a that may include an integrated circuit containing the hardware and software logic to perform the aforementioned operations. The electronics 213 also includes at least one connector 213b configured to connect to the sensor/window assembly 212 (e.g., the focal plane array 212a) and/or supporting electronics and logic that may integrate imager assembly 110 into a system (e.g., system 100). The electronics 213 may be formed with or incorporated in a frame 213b, similar to frame 211a and frame 212c.

Imager assembly 110 may further include a spacers 214 and 215. In various embodiments, the spacer 214 is placed between the sensor/window assembly 212 and the electronics 213 in order to provide sufficient space and/or act a buffer to protect sensitive components of the sensor/window assembly 212 and the electronics 213. For example, the spacer 214 may provide for sufficient height so that contact between the sensor/window assembly 212 and the electronics 213 does not damage the focal plane array 212a, the FPGA 213a, and/or the connector 213b. In various embodiments, the spacer 214 may provide an additional height that may be added to frame 212c and/or frame 213c. Similarly, the spacer 215 may be provided so as to provide additional space, height, and/or buffer area to protect the FPGA 213a and/or the connector 213b that connects to additional supporting electronics and logic. In some embodiments, the spacers 214 and 215 may be formed of material similar to the frames 211a, 212c, and 213c. The above described components may also be sealed and/or held together using the attachment mechanism 216. Although the attachment mechanism 216 is shown as bolts, screws, or other mechanical/physical fasteners, the attachment mechanism 216 may also comprise glue, epoxy, sealers and/or sealants, or other chemical bonding mechanism. For example, one type of attachment mechanism 216 may be ZYMET.

Figure 2B:
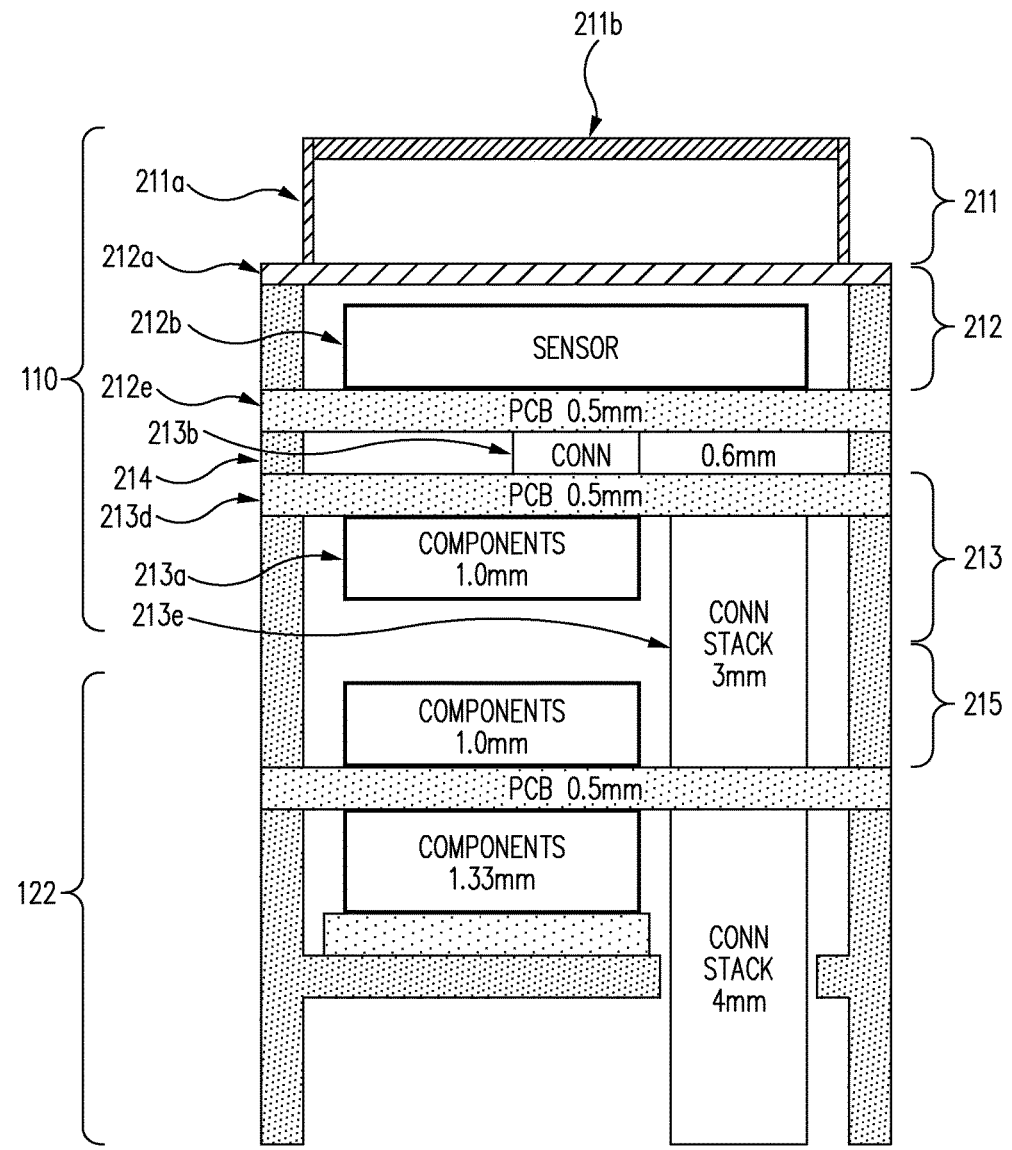
FIG. 2B illustrates an abstract block diagram of a constructed imager assembly having a protective window assembly shown in FIG. 2A, according to an embodiment.

FIG. 2B illustrates an abstract block diagram of a constructed imager assembly 110 having a protective window assembly 211 shown in FIG. 2A, according to an embodiment. In this regard, FIG. 2B shows a structural layout of the imager assembly 110. The imager assembly 110 is shown with the protective window assembly 211, the sensor/window assembly 212, and the electronics 213. Additionally, the imager assembly 110 is shown with the spacers 214 and 215.

FIG. 2B features a cutaway of the imager assembly 110 and portrayed through a block diagram. In relevant parts, the imager assembly 110 shows the protective window assembly 211 encapsulating the sensor/window assembly 212 with a window 211b disposed a distance above the sensor/window assembly 212. The protective window assembly 211 includes the frame 211a that extends the window 211b to a height/distance away from the sensor/window assembly 212, and specifically the sensor window 212b of the sensor/window assembly 212. The sensor window 212b is shown displayed above the focal plane array 212a so that the sensor window 212b is a closer distance to the focal plane array 212a and within a focal plane/focus of the focal plane array 212a. The focal plane array 212a is shown disposed on a printed circuit board (PCD) 212e that holds the infrared sensors of the focal plane array 212a in place and allows a connection to be established for receiving thermal image data detected by the focal plane array 212a. Additionally, it is shown that the window 211b of the protective window assembly 211 unit is displaced far enough away from the sensor/window assembly 212 that the window 211b, and therefore damage and debris to the window 211b, is not in focus of the sensor/window assembly 212.

Connected to the sensor/window assembly 212 are the electronics 213 through the at least one connector 213b. The electronics 213 are shown as FPGA 213a attached to a backside of a PCB 213d to prevent interference and damage to and by the sensor/window assembly 212 and/or the PCB 212e of the sensor/window assembly 212 and/or the PCB 213d the electronics 213. Moreover, the spacer 214 is shown to give additional height/room to prevent contact and damage between the sensor/window assembly 212 and the electronics 213. Spacer 215 may similarly give additional room to enable a connection (e.g., using a connection 213e) between the electronics 213 and the supporting electronics 122 without damage to either unit. Thus, the connection 213e on the bottom side of PCB 213d may be utilized to connect to the supporting electronics 122.

Figure 3:
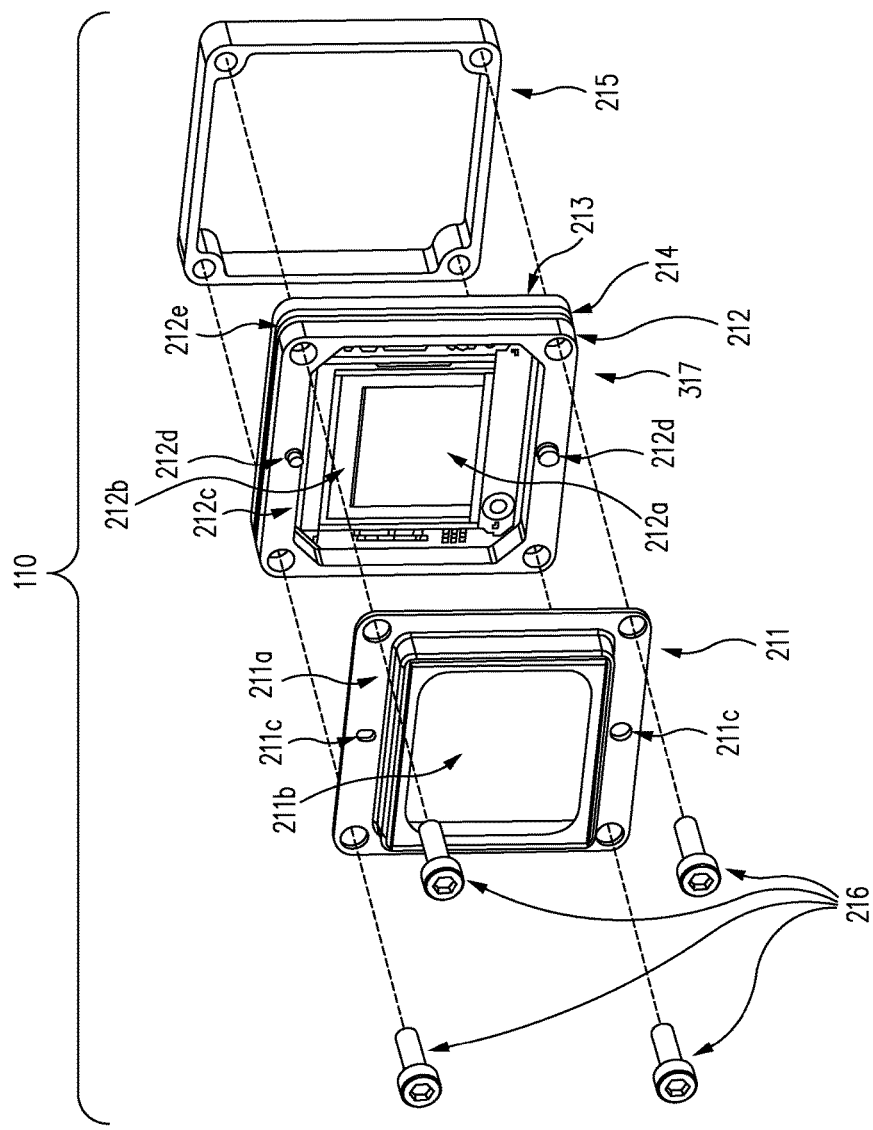
FIG. 3 illustrates an exploded view of a packaged thermal imaging unit and a protective window assembly for attachment to the packaged thermal imaging unit, according to an embodiment.

FIG. 3 illustrates an exploded view of a thermal imaging unit 317 and a protective window assembly 211 for attachment to the thermal imaging unit 317, according to an embodiment. Imager assembly 110 is shown with connection of the various components, such as after providing, constructing, and connecting the sensor/window assembly 212 and the electronics 213, with the spacer 214 between the sensor/window assembly 212 and the electronics 213, to form the thermal imaging unit 317 as packaged together. However, the thermal imaging unit 317 may further connect with the protective window assembly 211 to prevent damage and debris to the sensor window 212b. For example, the thermal imaging unit 317 (including the sub-parts of the thermal imaging unit 317, e.g., the sensor/window assembly 212, the electronics 213, and the spacer 214) may be constructed and/or connected in a "clean" room or other optimal conditions to prevent environmental and/or atmospheric damage to the sensor window 212b. However, as removal from these optimal conditions may still cause damage to the exposed sensor window 212b, FIG. 3 shows a joining of the protective window assembly 211 to the thermal imaging unit 317 prior to exposure of the thermal imaging unit 317 to such environmental factors.

Thus, the protective window assembly 211 may be joined to the thermal imaging unit 317 in the "clean" room or other environment that may limit or eliminate flaws on the sensor window 212b caused by dust, debris, or damage to the sensor window 212b. The protective window 212 may be aligned with the thermal imaging unit 317 using the alignment aperture 211c in the frame 211a with the alignment pin 212a in the frame 212c. The window 211b may then provide the cover for the sensor window 212b. Additionally, when joining the protective window assembly 211 and the thermal imaging unit 317, the attachment mechanism 216 may be utilized and the spacer 215 may be attached.

Figure 4:
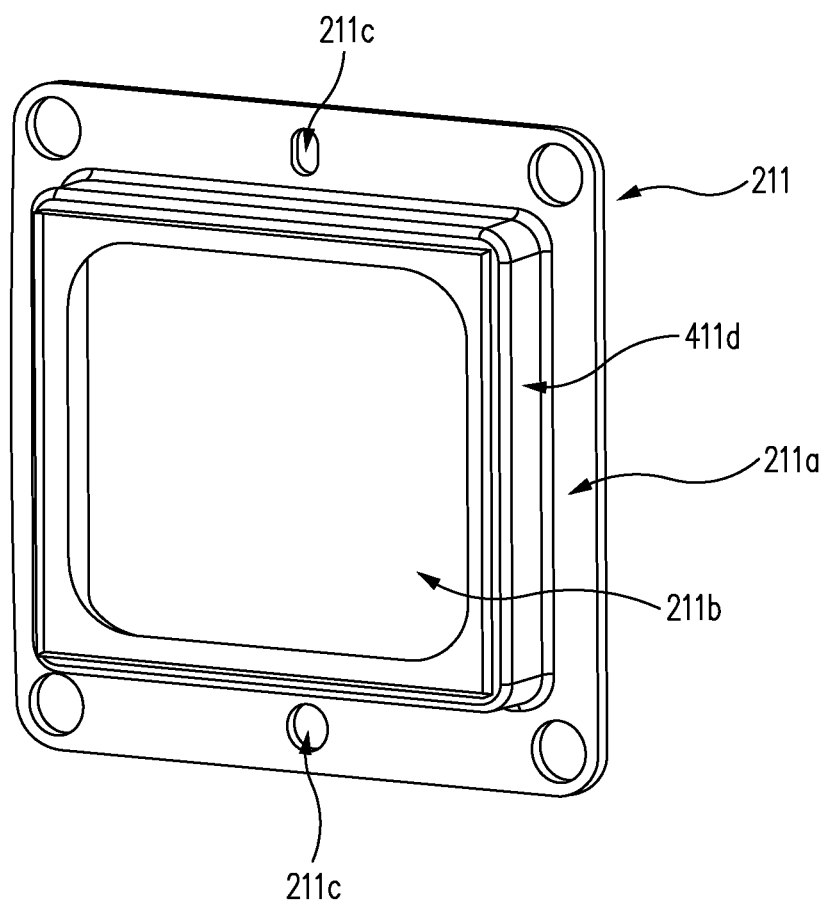
FIG. 4 illustrates an exemplary protective window assembly for an infrared imaging device, according to an embodiment.

FIG. 4 illustrates an exemplary protective window assembly 211 for an infrared imaging device, according to an embodiment. The protective window assembly 211 is shown absent the thermal imaging unit 317 of the imager assembly 110. As shown with respect to the protective window assembly 211, the frame 211a includes a flange 411d that extends to a height to offset the window 211b and accommodate a sufficient height to keep the window 211b out of focus from the sensor/window assembly 212 (and in particular the focal plane array 212a). The height of the flange 411d is shown and discussed in more detail with respect to numeral 684a of FIG. 6C. The frame 211a is further shown with an alignment aperture 211c used for alignment of the protective window assembly 211 with the thermal imaging unit 317 using the alignment pin 212d. As previously discussed, in various embodiments, the alignment pin 212d may provide alignment between the thermal imaging unit 317 and additional optics (e.g., the optics 124 of FIG. 1).

FIGS. 5A-C illustrate three views of a constructed imager assembly 110 having a protective window assembly 211, according to an embodiment. FIGS. 5A-5C show multiple perspectives of imager assembly 110 after connection of the various separate parts of imager assembly 110. For example, FIG. 5A shows a tilted view of imager assembly 110 with the constituent parts individually marked. Thus, starting from the left side of imager assembly 110 in FIG. 5A, the protective window assembly 211 is shown as connected/bonded to the sensor/window assembly 212, which features the PCB 212e with the attached focal plane array 212a (not shown in FIG. 5A) connected to the right. Further connected to the PCB 212e is the spacer 214 configured to provide room to connect the electronics 213 with the PCB 212e and thus the focal plane array 212a of the sensor/window assembly 212. Connected further to the electronics 213 at the furthest right is the spacer 215.

Imager assembly in FIG. 5A is connected using an attachment mechanism 216, shown as bolts or screws in FIG. 5A. However, other embodiments may use different bonding mechanisms, such as snaps, interlocking pieces, adhesives, or other fasteners. The protective window assembly 211 is aligned with the sensor/window assembly 212 using the alignment aperture 211c of the frame 211a and the alignment pin 212d on the sensor/window assembly 212. Once the bonding is complete, the window 211b prevents damage, debris, or other flaws from the sensor/window assembly 212.

FIG. 5B presents a side view of the above described imager assembly 110. Thus, as shown in FIG. 5B, the imager assembly 110 includes the protective window assembly 211 attached to the sensor/window assembly 212 having PCB 212e, which is further connected to electronics 213 (e.g., using the at least one connection 213b of FIGS. 2A and 2B). To provide spacing between PCB 212e and electronics 213 is the spacer 214. Further attached to the right side of electronics 213 is the spacer 215 in order to protect an FPGA of electronics 213 (e.g., FPGA 213a of FIGS. 2A and 2B). Again shown in FIG. 5B is the attachment mechanism 216 utilized to bind and seal the imager assembly 110. From the side perspective, the frame 211a can be shown with an offset height in the left direction to displace the window 211b some distance from the focal plane array of sensor/window assembly 212.

FIG. 5C presents a view of the above described imager assembly 110 as seen through the protective window assembly 211, e.g., from a scene captured by the imager assembly 110. The window 211b of the protective window assembly 211 is shown covering the sensor window 212b and thereby protecting the sensor window 212b. Moreover, the frame 211a is shown aligned with the rest of the imager assembly 110 through matching the alignment aperture 211c of the frame 211a with the alignment pin 212d. Finally shown bonding the imager assembly 110 together is the attachment mechanism 216.

Figure 6A:
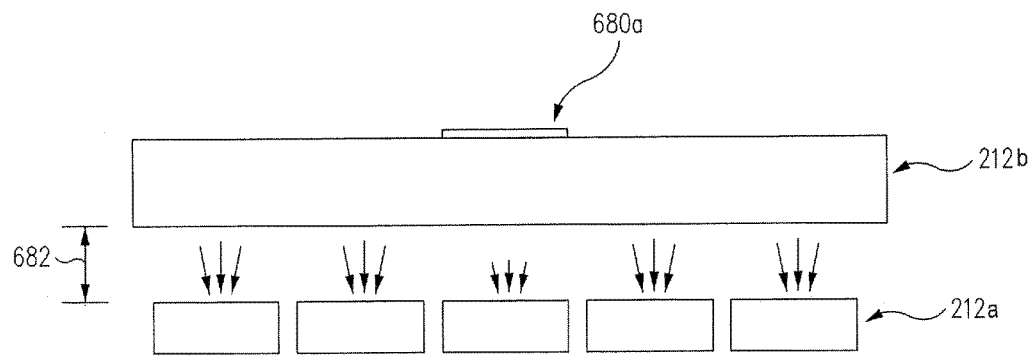
FIGS. 6A and B illustrate exemplary damage or debris on a sensor window according to the present disclosure with resulting thermal image data, according to an embodiment.

FIGS. 6A and B illustrate exemplary damage or debris on a sensor window 212b according to the present disclosure with resulting thermal image data, according to an embodiment. FIG. 6A shows an abstraction of a partial sensor/window assembly, e.g., sensor/window assembly 212 of FIGS. 2A and 2B, shown with the functional parts of the sensor window 212b and the focal plane array 212a. FIG. 6A is shown without the protective window assembly 211 and in particular the window 211b providing protection to the sensor window 212b and focal plane array 212a of the imager assembly 110. Additionally, the sensor window 212b and the focal plane array 212a are separated by a first distance 682. The first distance 682 may be a distance sufficiently small such that the sensor window 212b remains within focus/the focal plane of the focal plane array 212a. For example, the sensor window 212b may act as a first optic to focus the incoming thermal image radiation to the focal plane array 212a.

The sensor window 212b in FIG. 6A is shown with a flaw 680a. The flaw 680a may correspond to an environmental or atmospheric damage or debris to the sensor window 212b. The flaw 680a may also correspond to a flaw caused by improper handling of the sensor window 212b or by other optics, electronics, or parts coming into contact with the sensor window 212b with sufficient force to cause the flaw 680a. Thus, the flaw 680a may correspond to a flaw, irregularity, damage, debris, or other imperfection caused after fabrication of the sensor window 212b that causes an image artifact in resulting image data. Thus, the flaw 680a may correspond any post manufacturing irregularity on the sensor window 212b, e.g., the flaw 680a does not exist at the time of fabrication of the sensor window 212b and is not taken into account for the transmissivity, clarity, and optical properties of the sensor window 212b.

Figure 6B:
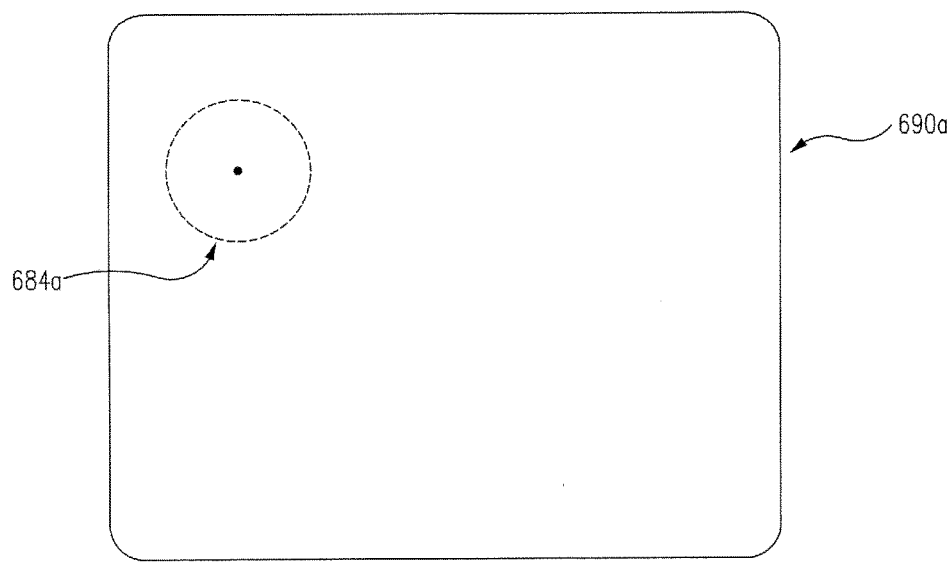
FIGS. 6C and D illustrate exemplary damage or debris on a protective window according to the present disclosure with resulting thermal image data, according to an embodiment.

Since the sensor window 212b is within the focus of the focal plane array 212a or focuses the incoming thermal image radiation for the focal plane array 212a due to the first distance 682 between the sensor window 212b and the focal plane array 212a, the flaw 680a becomes visible in resulting thermal image data captured by the focal plane array 212a. The resulting thermal image data is shown in FIG. 6B as it would appear displayed to a user. Thus, a thermal image data display 690a of a scene is shown with an inconsistency 684a as a result of the flaw 680a from FIG. 6A. In essence, this causes the thermal image data display 690a to display image artifacts (e.g., irregularities) that are not within thermal image radiation of a scene that is captured by the focal plane array 212a. Furthermore, the inconsistency 684a can lead to calibration errors of the imager assembly 110.

FIGS. 6C and D illustrate exemplary damage or debris on a protective window 211b according to the present disclosure with resulting thermal image data, according to an embodiment. FIG. 6C shows an abstraction of a partial imager assembly, e.g., imager assembly 110 of FIGS. 2A and 2B, shown with the functional parts of the sensor window 212b and the focal plane array 212a, however, with the sensor window 212b protected by the window 211b of the protective window assembly 211 unit. The sensor window 212b and the focal plane array 212a are again separated by a first distance 682 that may comprise some distance where the sensor window 212b acts as a focusing optic for the focal plane array 212a, or the sensor window 212b is still within focus of the focal plane array 212a. However, in the embodiments shown in FIG. 6C, the window 211b of the protective window assembly 211 is separated by a second distance 686. The second distance 686 may be configured so that the window 211b is only slightly in focus to the focal plane array 212a, and thus any damage, debris, or flaws on the window 211b is not reflected in thermal image data captured by the focal plane array 212a. Thus, the second distance 686 is some distance greater than the first distance 682. As shown in FIG. 6C, the second distance 686 is larger than the first distance 682 comparatively. However, a range of distances may be utilized for the second distance 686 so long as the second distance 686 attributes to the aforementioned features between the window 211b and the focal plane array 212a (e.g., flaws to the window 211b are out of focus to the focal plane array 212a or the sensor window 212b).

A flaw 680b is shown in FIG. 6C on the window 211b. The flaw 680b may correspond to the flaw 680a, such as a flaw caused by damage, environment/atmospheric debris, or other damage/debris caused post-manufacturing of the window 211b. However, and as will be shown in thermal image data display 690b, the flaw does not show up as an inconsistency in the thermal image data due to the window 211b and the second distance 686 between the window 211b and the sensor window 212b/the focal plane array 212a. In certain embodiments, the second distance may be greater than approximately 0.025. However, larger flaws may cause image artifacts, inconsistencies, or irregularities in the thermal image data. Thus, a larger distance of greater than approximately 0.060 may be used in other embodiments.

Figure 6D:
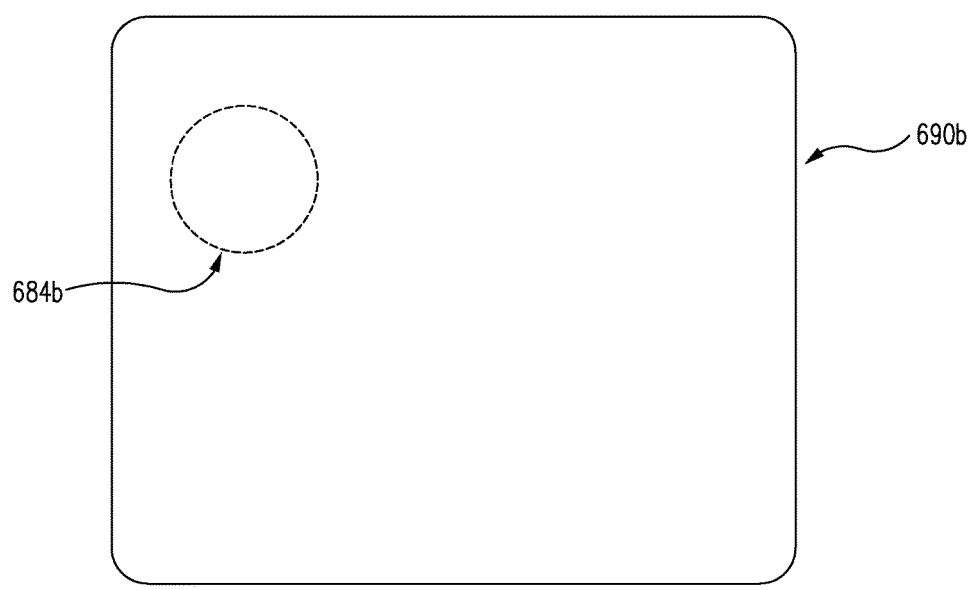

Thermal image radiation captured by the focal plane array 212a of FIG. 6C is shown on a display in FIG. 6D. Thus, FIG. 6D displays a thermal image data display 690b resulting from the thermal image data. However, in contrast to FIG. 6C, which shows the inconsistency 684a in the thermal image data display 690a when the flaw 680a is on the sensor window 212b, the thermal image data display 690b does not show the inconsistency 684a. Thus, an area 684b is free from the image artifact (e.g., inconsistency or irregularity) caused by the flaw 680b on the window 211b. This is due to the window 211b being the second distance 686 from the sensor window 212b.

Figure 7A:
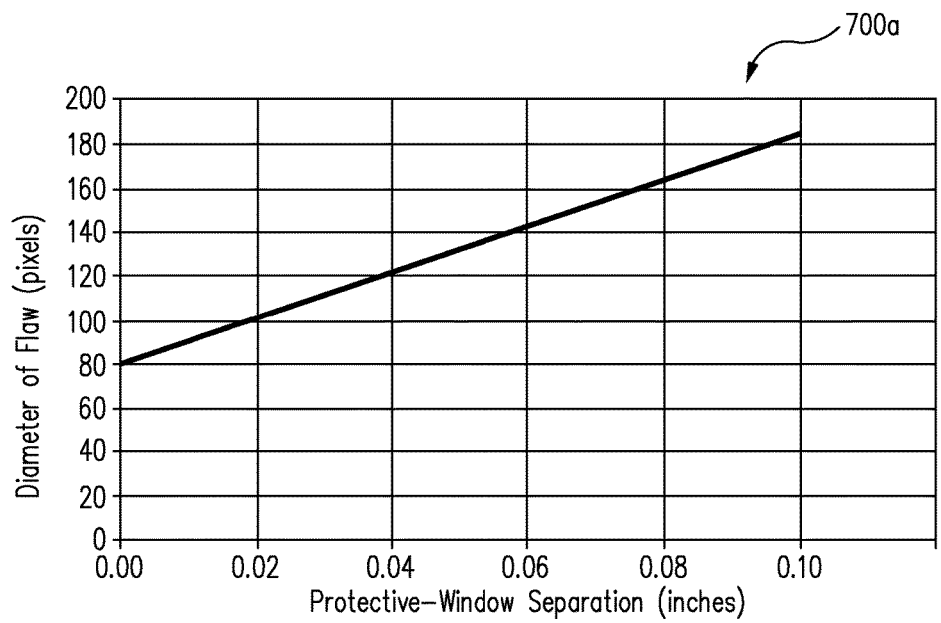
FIG. 7A illustrates comparative flaw pixel size in resulting thermal image data for increasing distance between a protective window and a sensor window, according to an embodiment.

FIG. 7A illustrates comparative flaw size and distance from a sensor window compared to flaw intensity in the resulting thermal image data, according to an embodiment. In FIG. 7A, graph 700a shows the relative size of the flaw 680b to the window 211b and the comparative distance the window 211b should be from the sensor window 212b in order to prevent the flaw 680b from causing errors in the resulting thermal image data. As shown, the diameter of the flaw 680b (e.g., in number of pixels of the resulting thermal image data) increases proportionally (e.g., linearly as shown in FIG. 7A, or otherwise) to the separation distance (e.g., in inches) between the window 211b and sensor window 212b. A small diameter flaw therefore requires less separation distance between the window 211b and the sensor window 212b to be negligible in the resulting thermal image data. In contrast, larger diameter flaws require larger separation between the window 211b and the sensor window 212b otherwise the flaw on the window 211b will remain visible in the resulting thermal image data.

Figure 7B:
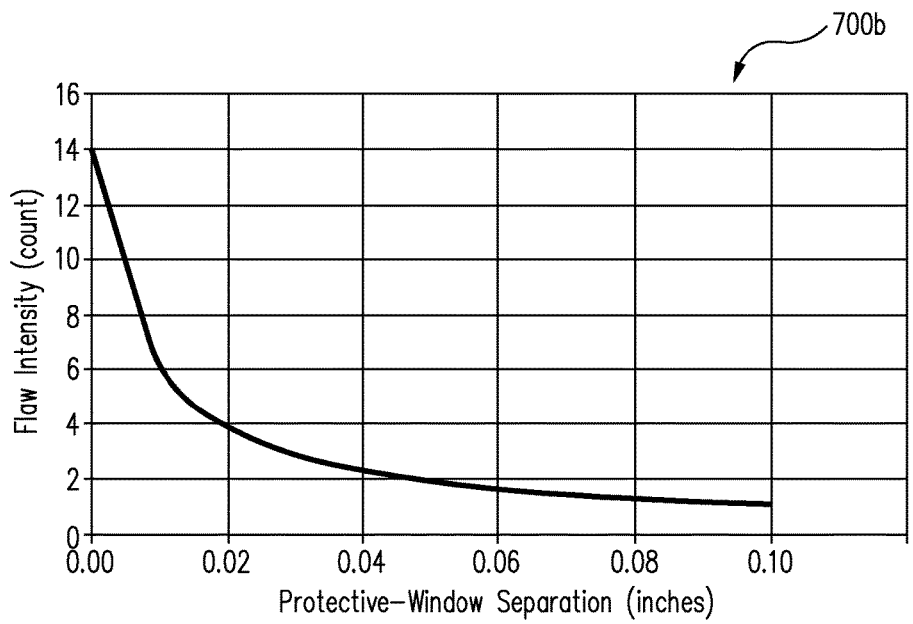
FIG. 7B illustrates comparative flaw count intensity in resulting thermal image data for increasing distance between a protective window and a sensor window, according to an embodiment.

Flaw intensity in the resulting thermal image data may also factor in choosing a distance to place the window 211b from the sensor window 212b. In graph 700b of FIG. 7B, flaw intensity is identified by a count value for pixels displaying the flaw 680b in the resulting thermal image data (e.g., which is one measurement of how apparent the flaw may be in the resulting thermal image data; in other embodiments, other measurements may be used). For example, flaw 680b that is very intense in the thermal image data may result in inconsistencies or unreadable thermal image data. In contrast, less intense flaws may not be noticeable in the thermal image data. Thus, as the distance from the sensor window 212b increases, there is a sharp decline in the count intensity of the irregularity caused by the flaw 680b in the thermal image data. Flaw intensity in the resulting thermal image data decreases inversely proportional (e.g., nonlinearly as shown in FIG. 7B, or otherwise) to the separation distance between the window 211b and the sensor window 212b of imager assembly 110. Thus, a flaw may be very intense where the flaw occurs right at the sensor window 212b or at a very close distance. The intensity may sharply decline as the distance of the flaw 680b from the sensor window 212b increases. Thus, a flaw may be nearly unnoticeable as the separation distance increases.

Figure 8:
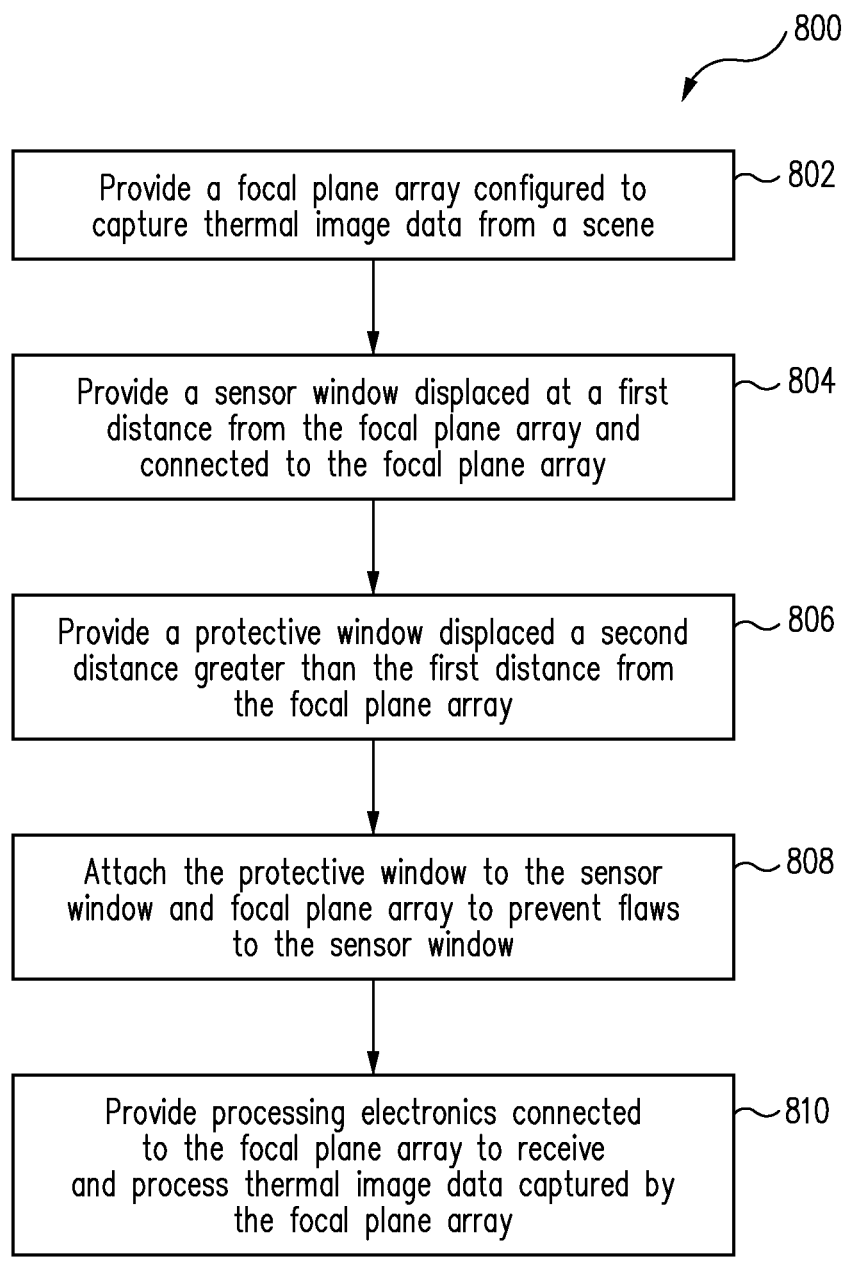
FIG. 8 illustrates a process to assemble a device having a protective window, according to an embodiment.

FIG. 8 illustrates a process to assemble a device having a protective window, according to an embodiment. Note that one or more steps, processes, and methods described herein may be omitted, performed in a different sequence, or combined as desired or appropriate.

At step 802, a focal plane array configured to capture thermal image data from a scene is provided. The focal plane array may comprise one or a plurality of infrared detectors configured to detect thermal radiation from a scene and capture the thermal radiation as a thermal image of the scene. Thus, the focal plane array may be configured to capture thermal image data, which may be processed by attached electronics and/or supporting electronics of a connectable system. The focal plane array may correspond to a plurality of infrared detectors disposed on a substrate.

A sensor window is provided, at step 804, where the sensor window is displayed at a first distance from the focal plane array and connected to the focal plane array. For example, the sensor window may form a wafer-level packaged (WLP) or pixel-level packaged (PLP) assembly with the focal plane array where the focal plane array is vacuum packaged with the sensor window. The sensor window may form a transmissive window to the focal plane array that may allow thermal (e.g., infrared) radiation to penetrate the window and be received by the focal plane array. In further embodiments, the sensor window may also act as an optical device for the focal plane array, thereby focusing incoming thermal radiation to the focal plane array. Thus, the first distance that the sensor window is displaced from the focal plane array may cause the sensor window to be within focus of image captured by the focal plane array.

At step 806, a protective window is provided, which is displaced a second distance greater than the first distance from the focal plane array. The protective window may be formed from a durable material (e.g., silicon, germanium, zinc selenide, chalcogenate glass, plastics, polymers, sapphire, or others) and bonded to a frame using, for example, and epoxy, adhesive, ZYMET, or other chemical bonding agent. The frame may displace the protective window the second distance from the sensor window when the frame is attached to a package (e.g., sensor/window assembly) created from the sensor window and the focal plane array. The second distance may be sufficient to cause the protective window to be out of focus to the sensor window or the focal plane array. For example, the protective window may be displaced greater than 0.025" from the sensor window or the focal plane array in one embodiment, or greater than 0.060" in another embodiment.

The protective window is attached to the sensor window and the focal plane array to prevent flaws to the sensor window, at step 808. As previously discussed, the protective window may be bonded to a frame, which may in turn connect to the package (e.g., the WLP or PLP) containing the sensor window and the focal plane array. The connection may be guided using alignment pins and matching alignment apertures on the frame and the package. Once the protective window, the sensor window, and the focal plane array are joined into one unit, processing electronics may be provided, which may be connected to the focal plane array to receive and process thermal image data captured by the focal plane array. The resulting imager assembly may then be durable enough to prevent flaws to the sensor window and therefore inconsistencies/irregularities in captured thermal image data. The processing electronics may correspond to an FPGA that provides some calibration of the focal plane array, and may further connect to a system for processing the thermal image data captured by the assembled imager assembly.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A device for an infrared camera comprising:
    a vacuum packaged assembly comprising a focal plane array configured to capture thermal image data from a scene and a sensor window configured to seal an evacuated area of the vacuum packaged assembly, wherein the sensor window is displaced a first distance from the focal plane array;
    a protective window disposed adjacent to and in close proximity to the sensor window and displaced a second distance greater than the first distance from the focal plane array, wherein the second distance is predetermined such that damage or debris incident on the protective window is out of focus to the focal plane array, and wherein the protective window is disposed between the sensor window and any optics to be coupled to the infrared camera that incorporates the device; and a frame for the device configured to form a package comprising the protective window directly connected to the vacuum packaged assembly.

2. The device of claim 1, wherein the protective window prevents image artifacts in the thermal image data resulting from environmental factors disposed on the protective window, and wherein the protective window does not produce optical characteristics in the thermal image data during use of the device.

3. The device of claim 1, wherein the device further comprises:

an alignment pin on the frame, wherein the alignment pin is configured to align the frame with the optics provided by the infrared camera connected with the device.

4. The device of claim 1, further comprising:

a sealing mechanism for the frame and configured to join together the focal plane array, the sensor window, and the protective window, wherein the sealing mechanism prevents damage and debris collection on the sensor window.

5. The device of claim 1, further comprising:

a printed circuit board assembly attachable to the focal plane array and configured to process the thermal image data.

6. The device of claim 5, further comprising:

a first spacer between the focal plane array and the printed circuit board assembly.

7. The device of claim 6, further comprising:

a second spacer connected to the printed circuit board assembly and configured to connect to additional image processing electronics.

8. The device of claim 7, wherein the infrared camera further comprises the additional image processing electronics configured to record the thermal image data and connected to the printed circuit board assembly.

9. The device of claim 1, wherein the second distance comprises a distance from the protective window to the sensor window greater than or equal to approximately 0.005 inches and less than or equal to approximately 0.100 inches.

10. The device of claim 1, wherein the package for the device comprises a removable portion of the infrared camera.

11. A method of operating the device of claim 1, the method comprising:

capturing the thermal image data from the scene using the device.

12. A method for providing a device for an infrared camera comprising:

providing a vacuum packaged assembly comprising a focal plane array configured to capture thermal image data from a scene and a sensor window configured to seal an evacuated area of the vacuum packaged assembly, wherein the sensor window is displaced at a first distance from the focal plane array;

providing a protective window disposed adjacent to and in close proximity to the sensor window and displaced a second distance greater than the first distance from the focal plane array, wherein the second distance is predetermined such that damage or debris incident on the protective window is out of focus to the focal plane array, and wherein the protective window is disposed between the sensor window and any optics to be coupled to the infrared camera that incorporates the device; and providing a frame for the device configured to form a package comprising the protective window directly connected to the vacuum packaged assembly.

13. The method of claim 12, wherein the protective window prevents image artifacts in the thermal image data resulting from environmental factors disposed on the protective window, and wherein the protective window does not produce optical characteristics in the thermal image data during use of the device.

14. The method of claim 12, further comprising:

providing an alignment pin on the frame configured to align the frame with the optics provided by the infrared camera connected with the device.

15. The method of claim 14, further comprising:

sealing the focal plane array, the sensor window, and the protective window together using a sealing mechanism for the frame, wherein the sealing mechanism prevents damage and debris collection on the sensor window.

16. The method of claim 12, further comprising:

providing a printed circuit board assembly that is detachable from the focal plane array, wherein the printed circuit board assembly is configured to process the thermal image data.

17. The method of claim 16, further comprising:

providing a first spacer between the focal plane array and the printed circuit board assembly.

18. The method of claim 17, further comprising:

providing a second spacer to the printed circuit board assembly, wherein the second spacer is configured to connect to additional image processing electronics.

19. The method of claim 11, wherein the second distance comprises a distance from the protective window to the sensor window greater than or equal to approximately 0.005 inches and less than or equal to approximately 0.100 inches.

* * * * *